(12) United States Patent
Pieraccini et al.

(10) Patent No.: US 8,180,025 B2
(45) Date of Patent: May 15, 2012

(54) METHODS AND APPARATUS FOR ENFORCING CALLER LISTENING BEHAVIOR ON INTERACTIVE VOICE RESPONSE APPLICATIONS

(75) Inventors: Roberto Pieraccini, Peekskill, NY (US); Eric Woudenberg, Amherst, MA (US); Ilija Zeljkovic, Scotch Plains, NJ (US)

(73) Assignee: SpeechCycle, Inc., New York, NY (US)

( * ) Notice: Subject to any disclaimer, the term of this patent is extended or adjusted under 35 U.S.C. 154(b) by 1346 days.

(21) Appl. No.: 11/651,799

(22) Filed: Jan. 10, 2007

(65) Prior Publication Data

US 2007/0165794 A1    Jul. 19, 2007

Related U.S. Application Data

(60) Provisional application No. 60/759,236, filed on Jan. 12, 2006.

(51) Int. Cl.
*H04M 1/64* (2006.01)
(52) U.S. Cl. .......... 379/88.02; 379/76; 379/266.07; 340/7.51

(58) Field of Classification Search .... 379/88.01–88.04, 379/88.13, 88.17, 88.18, 215.01, 72, 76, 379/167.08, 263, 265.01–266.1; 704/270.1; 340/7.51
See application file for complete search history.

(56) References Cited

U.S. PATENT DOCUMENTS

| | | | |
|---|---|---|---|
| 5,825,867 A * | 10/1998 | Epler et al. ............... | 379/215.01 |
| 6,771,746 B2 * | 8/2004 | Shambaugh et al. ...... | 379/88.13 |
| 2004/0230434 A1 * | 11/2004 | Galanes et al. ........... | 704/270.1 |

* cited by examiner

*Primary Examiner* — Md S Elahee
(74) *Attorney, Agent, or Firm* — Frommer Lawrence & Haug LLP; William S. Frommer

(57) ABSTRACT

An interactive voice response (IVR) system which allows a caller to barge-in on all prompts, yet still allows the caller to receive important information contained in the prompts. When a caller barges-in on a prompt that contains important information, the IVR system interrupts the prompt to play a short announcement with the goal of re-enforcing the importance of listening to the entire prompt. The IVR system then resumes playback of the prompt, from the beginning or of a modified version.

16 Claims, 2 Drawing Sheets

METHODS AND APPARATUS FOR ENFORCING CALLER LISTENING BEHAVIOR ON INTERACTIVE VOICE RESPONSE APPLICATIONS

CROSS-REFERENCE TO RELATED APPLICATIONS

This application claims a priority benefit to provisional application Ser. No. 60/759,236, filed on Jan. 12, 2006 which is hereby incorporated by reference in its entirety herein.

BACKGROUND OF THE INVENTION

In order to provide prompt and convenient service for customers, many companies have established customer support call centers. These centers provide one or more telephone numbers a customer can use to receive service and support information about various products. Typically, a customer experiencing a problem with or having a question about a particular product or service or having questions or difficulty installing or configuring a product or service will call the corresponding support center to receive specific information relating to the question or problem and preferably, instructions for resolving the problem.

However, these customer support call centers suffer from at least the following problems. First, staffing a call center with enough knowledgeable operators, also called agents or customer service representatives, to address a meaningful range of likely problems can be very expensive. The call center must hire enough agents to handle those times when most calls occur, or callers could have excessively long hold times before speaking to an agent. Long hold times are annoying to customers and hurt a company's reputation for providing quality customer service. Long hold times are an even bigger problem when the company does not provide a toll-free number and the caller is required to pay for the call. Thus, a call center might have more agents than needed at any given time with their associated costs.

Second, the time and cost required to train new agents is considerable and in some cases it could be weeks before an agent is allowed to answer a call on his own. Agents staffing the support center must be provided with the knowledge necessary to resolve common product and service related questions and problems. Often, because of the large scope of potential problems, it is simply not practical to impart the required information (i.e. the problem knowledge base) to each agent. For example, many of today's complex products require a team of engineers—each having a specialized area of expertise—to design, build, and service the products. Thus, a single person may not have all the information needed to solve a particular problem.

Third, the job of an agent is often very repetitive, and turnover can be high as agents lose interest in their work and quit their jobs. The most common customer support questions can represent up to 80% of all calls received. Turnover of 50% or greater is not unusual. For example, for a company with 100 agents experiencing 50% turnover, 50 agents would quit in a 12-month period. High turnover adds additional costs to the customer support call center for recruiting and training.

In an attempt to automate call centers, some companies have tried using prerecorded messages to provide answers to various common problems. Typically, a caller will hear simple audio recordings of portions of a spoken dialog that identify specific topics or problems. The caller is asked to press a certain key on his phone to identify the problem he is having. The caller will then hear another simple audio recording in the form of instructions for resolving a particular problem. These automated recordings are presented to the caller using what is called touch-tone Interactive Voice Response (IVR). Although the IVR instructions may resolve the aforementioned problems, the prerecorded solutions lack the flexibility to accept spoken inputs from the customer and tailor the response to the customer's specific situation. In addition, in order that the recordings be kept within a reasonable amount of time (since callers must memorize the instructions), the instructions may be simplified and generalized to such an extent that they do not provide sufficient help for the caller. Often, this results in unresolved problems and customer frustration.

A typical problem experienced when using IVR applications is in enticing the caller to use the application rather than requesting the service of a human agent. While IVR applications are becoming more and more sophisticated with the utilization of ASR (Automatic Speech Recognition) having intuitive and easy to use VUIs (Voice User Interfaces), the perception of the user population is not on par with these applications' actual capabilities. In fact, today many IVR applications are capable of completely replacing human agents in handling simple, as well as relatively complex tasks. The benefit for companies deploying IVR based systems is in the reduced TCO (Total Cost of Ownership) of the service; i.e. the cost of an automated transaction via an IVR system is certainly lower than the cost of labor of a human agent performing the same task. The benefit for the caller is in the reduced hold time and, in some cases, a more streamlined task completion.

Given the low acceptance of IVR systems by the general population, often based on the wrong perception that their problem cannot be solved by a machine, a number of expedients have been introduced in the past in order to engage callers and convince them to cooperate with the IVR system. One of the main issues is in balancing the caller's ability to barge-in or interrupt the system with the need to listen to some of the prompts or announcements presented by the IVR. Some prompts may contain key information for the callers and help them to realize that the system may indeed help solve their problem. Callers who do not perceive that an IVR system can help in solving their problem, tend to barge-in during the early prompts or announcements in order to request the help of a human operator.

Barge-in is a commonly deployed technology in IVR systems that allows callers who already know the answer to expedite the transaction. Once a barge-in attempt (during the playing of a prompt) is detected by the IVR system, the currently playing prompt is stopped and the caller's input is collected and processed. Callers that barge-in for the reasons discussed above—or for other reasons—are thus not given an opportunity to listen to the whole prompt or announcement, which may contain important information that can help the caller decide whether the IVR system can solve their problem.

A typical solution adopted in previous IVR systems is to disable barge-in for those prompts that include important information. However, by disabling barge-in for some of the prompts, callers may become confused and irritated because they do not understand why they can interrupt some of the prompts and not others. Moreover, non-bargeable prompts often increase a caller's frustration due to a perception that the system is not listening.

SUMMARY OF THE INVENTION

Therefore, a need exists for a system which allows the caller to barge-in on all prompts and still allows the caller to receive important information contained in the prompts.

Accordingly, the present invention allows barge-in on all prompts and, in the case of a user barge-in on those prompts that contain important information, the IVR will interrupt the prompt and then play a short announcement with the goal of re-enforcing the importance of listening to the whole prompt. The IVR will then resume playback of the prompt, from the beginning, or in a modified version, according to the preference of the Voice User Interface (VUI) designer.

Still other objects and advantages of the invention will in part be obvious and will in part be apparent from the specification and the drawings.

BRIEF DESCRIPTION OF THE DRAWING

For a more complete understanding of the invention, reference is made to the following description and accompanying drawing, in which.

DETAILED DESCRIPTION OF THE PREFERRED EMBODIMENTS

The preferred embodiments of the apparatus and method according to the present invention will be described with reference to the accompanying drawing.

Figure 1:
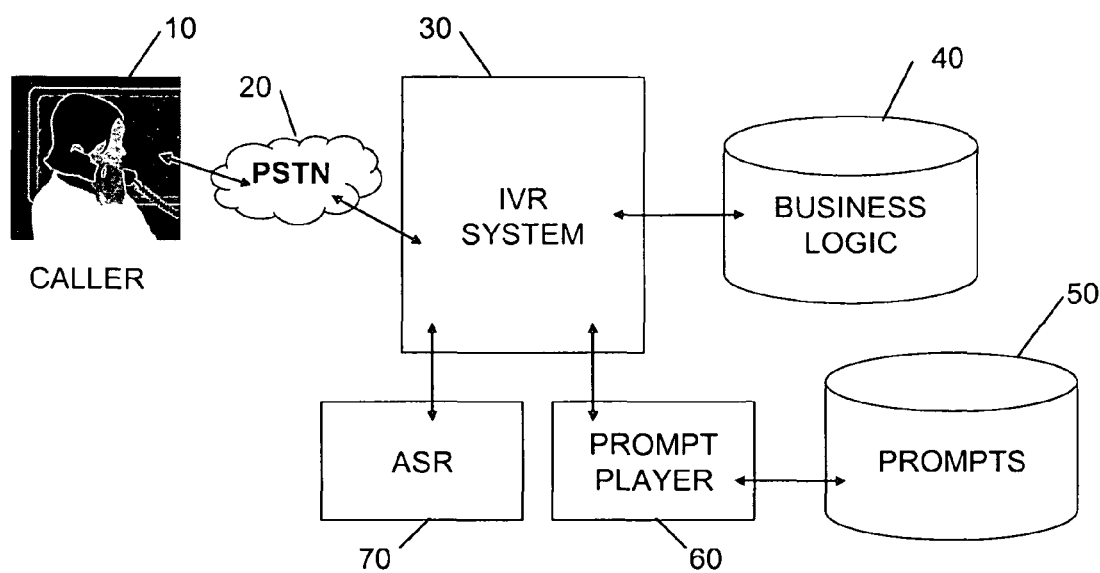
FIG. 1 is a diagram showing an exemplary system in accordance with the teachings of the present invention.

FIG. 1 shows the architecture of a system on which the present invention may be implemented. As shown in FIG. 1, a caller 10 connects, via the public telephone network (PSTN) 20, or another network, to an IVR system 30. The IVR system controls two types of resources: 1) an Automatic Speech Recognition (ASR) system 70 which provides an interpretation of the caller's speech and 2) a prompt player 60 which, as requested by the IVR, accesses and plays to the caller one or more of the prompts contained in a database of prompts 50. To all purposes, prompts can be stored in the database as audio files or text. In the latter case, the prompt player may be a text-to-speech system which will provide for adequate conversion of the text into human sounding speech. The IVR system is controlled by business logic 40, which determines, upon the interpretation of the caller speech, which prompt to play or which other action to perform (for instance, the IVR can be connected to another system, not shown in the figure, and request additional services or information in order to appropriately address the caller's issue).

Following the instructions included in the business logic, the IVR can: a) activate or stop the ASR and b) request or stop the playing of a prompt. Barge-in capability is typically implemented by allowing the IVR system, upon detection of the caller's speech, to interrupt a playing prompt, and activate the ASR in order to interpret the incoming speech. This capability, which can be enabled or disabled for any turn of the interaction, is available in commercial IVR and ASR engines.

The invention described herein may act upon a certain number of designated prompts that are deemed "important-for-the-caller-to-listen" to by the VUI designer who has designed the business logic which controls the interaction. When one of these designated prompts (e.g. an initial prompt) is played, and in case the caller starts speaking before the player is finished playing the prompt, the IVR may perform the following steps:

1. Interrupt the prompt player activity;
2. Activate the speech recognition system on the speech collected by the user;
3. Verify that the user has not spoken one of a set of reserved words or phrases, identified by the VUI designer, which may cause special actions, as described by the business logic. For instance, one may want to treat requests such as "operator" or "help" in a different manner, by allowing full barge-in and acting upon them;
4. If the user has not spoken one of the reserved words or phrases, the IVR instructs the prompt player to retrieve a predetermined barge-in-acknowledgment prompt which reassures the user that the system is listening, but states that important information has to be heard first; and
5. The IVR instructs the prompt player to play the initial prompt again, or a modified version of it, according to the instructions included in the business logic as specified by the VUI designer.

In order to avoid the possibility of loop behavior (e.g. the user keeps barging-in) a maximum number of replications of the described behavior can be set during the design phase. If that maximum number is exhausted, an escape action is taken by the IVR (for example, the initial prompt is played with barge-in disabled).

Figure 2:
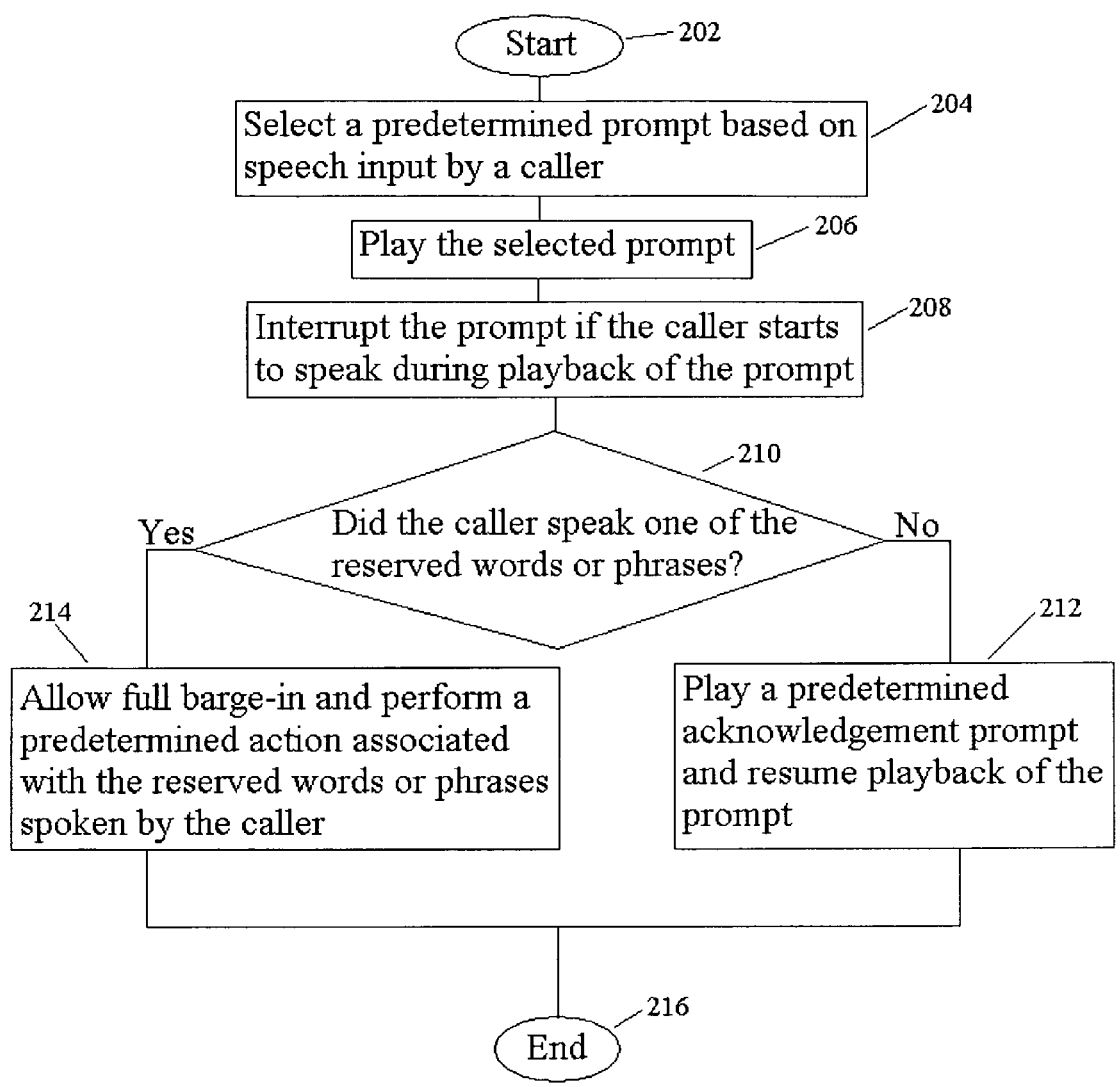
FIG. 2 is a flow chart showing an exemplary method in accordance with the teachings of the present invention.

FIG. 2 is a flow chart of the method implementing the present invention, which is embodied in software that maybe recorded on a computer readable medium. Step 202 begins the method. At step 204 business logic 40 determines which prompt to play and selects a predetermined prompt from a database of prompts 50 based on recognized speech input by a caller. The process advances to step 206 which plays the predetermined prompt using the prompt player 60. At step 208, playback of the prompt is interrupted if the caller starts to speak during playback of the prompt. Query 210 determines if the caller spoke one of the plurality of reserved words or phrases as recognized by ASR 70. If the answer to query 210 is "yes", step 214 allows full barge-in and performs a predetermined action associated with the reserved words or phrases spoken by the caller. Examples of the predetermined action include transferring the caller to a live agent, playing a help prompt and resuming playing of the original prompt, and starting the interaction from the beginning or some previous point. If the answer to query 210 is "no", the process advances to step 212. At step 212, the IVR 30 instructs the prompt player 60 to retrieve and play a predetermined barge-in acknowledgement prompt and resumes playback of the prompt. The predetermined barge-in acknowledgement prompt is a prompt which, for example, reassures the caller that the system is listening, but states that important information has to be heard first. The process then advances to step 216 which ends the process.

While a preferred embodiment of the present invention has been described using specific terms, such description is for illustrative purposes only, and it is to be understood that changes and variations may be made without departing from the spirit or scope of the following claims.

What is claimed is:

1. A method of enforcing caller listening behavior on interactive voice response applications, comprising the steps of:
    selecting a predetermined prompt from a database of prompts based on speech input by a caller;
    playing said predetermined prompt;
    interrupting said predetermined prompt if said caller starts to speak during playback of said predetermined prompt;
    determining whether the caller has spoken at least one of a plurality of predetermined reserved words or phrases;
    allowing full barge-in and performing a predetermined action associated with the predetermined plurality of reserved words or phrases determined to have been spoken by the caller; and playing a predetermined barge-in-acknowledgement prompt informing the caller to continue listening to the information in the predetermined prompt if it is determined that the caller has not spoken one of said plurality of reserved words or phrases and resuming playback of said predetermined prompt, wherein the method further comprises activating a speech recognition system to interpret speech input by said caller.

2. The method according to claim 1, wherein said selecting step selects said predetermined prompt based on an interpretation by said speech recognition system.

3. The method according to claim 1, wherein the step of playing said predetermined barge-in-acknowledgement prompt replays said predetermined prompt from the beginning.

4. The method according to claim 1, wherein the step of playing said predetermined barge-in-acknowledgement prompt plays a modified version of said predetermined prompt.

5. The method according to claim 1, wherein if the caller interrupts said predetermined prompt a predetermined number of times, said predetermined prompt is played to completion and said caller's speech is ignored until playback of said predetermined prompt is complete.

6. The method according to claim 1, wherein said predetermined prompt is an audio file.

7. The method according to claim 1, wherein said predetermined prompt is a text file.

8. The method according to claim 7, further comprising: converting said text file to speech.

9. A system for enforcing caller listening behavior on interactive voice response applications, comprising:
   means for selecting a predetermined prompt from a database of prompts based on speech input by a caller;
   means for playing said predetermined prompt;
   means for interrupting said predetermined prompt if said caller starts to speak during playback of said predetermined prompt;
   means for determining whether the caller has spoken at least one of a plurality of predetermined reserved words or phrases;
   means for allowing full barge-in and performing a predetermined action associated with the predetermined reserved words or phrases determined to have been spoken by the caller; and
   means for playing a predetermined barge-in-acknowledgement prompt informing the caller to continue listening to the information in the predetermined prompt if it is determined that the caller has not spoken one of said plurality of reserved words or phrases and resuming playback of said predetermined prompt, wherein the system further comprises means for activating a speech recognition system to interpret speech input by said caller.

10. The system according to claim 9, wherein said selecting means selects said predetermined prompt based on an interpretation by said speech recognition system.

11. The system according to claim 9, wherein said means for playing said predetermined barge-in-acknowledgement prompt replays said predetermined prompt from the beginning.

12. The system according to claim 9, wherein said means for playing said predetermined barge-in-acknowledgement prompt plays a modified version of said predetermined prompt.

13. The system according to claim 9, wherein if the caller interrupts said predetermined prompt a predetermined number of times, said predetermined prompt is played to completion and said caller's speech is ignored until playback of said predetermined prompt is complete.

14. The system according to claim 9, wherein said predetermined prompt is an audio file.

15. The system according to claim 9, wherein said predetermined prompt is a text file.

16. The system according to claim 15, further comprising: means for converting said text file to speech.

* * * * *